June 30, 1959 — R. E. LOWE — 2,892,556
VEHICLE LOAD HANDLING CONSTRUCTION
Filed Aug. 10, 1956 — 2 Sheets-Sheet 1
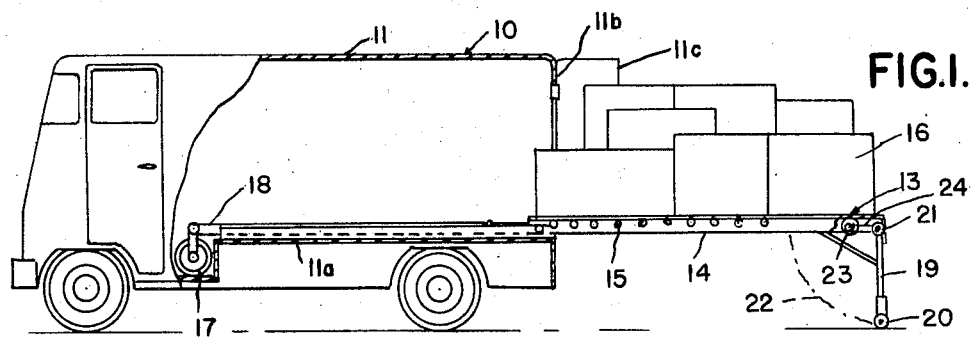
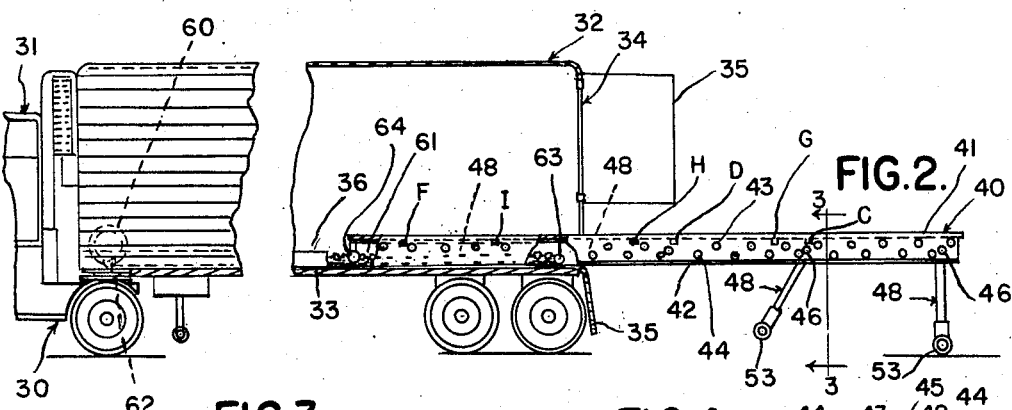
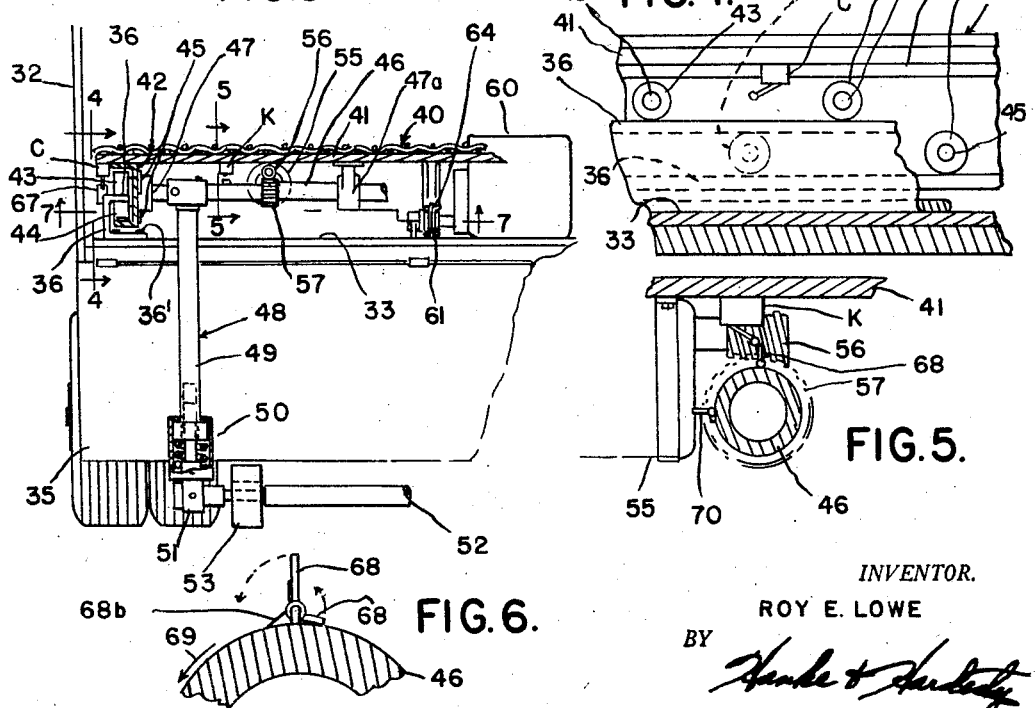
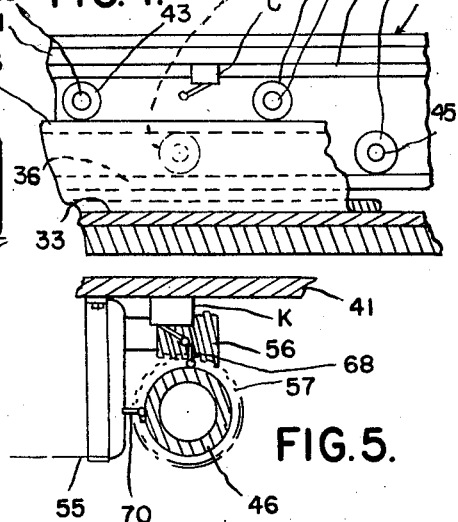
INVENTOR.
ROY E. LOWE
BY
Hanke & Hanke
ATTORNEYS June 30, 1959
R. E. LOWE
2,892,556
VEHICLE LOAD HANDLING CONSTRUCTION
Filed Aug. 10, 1956
2 Sheets-Sheet 2
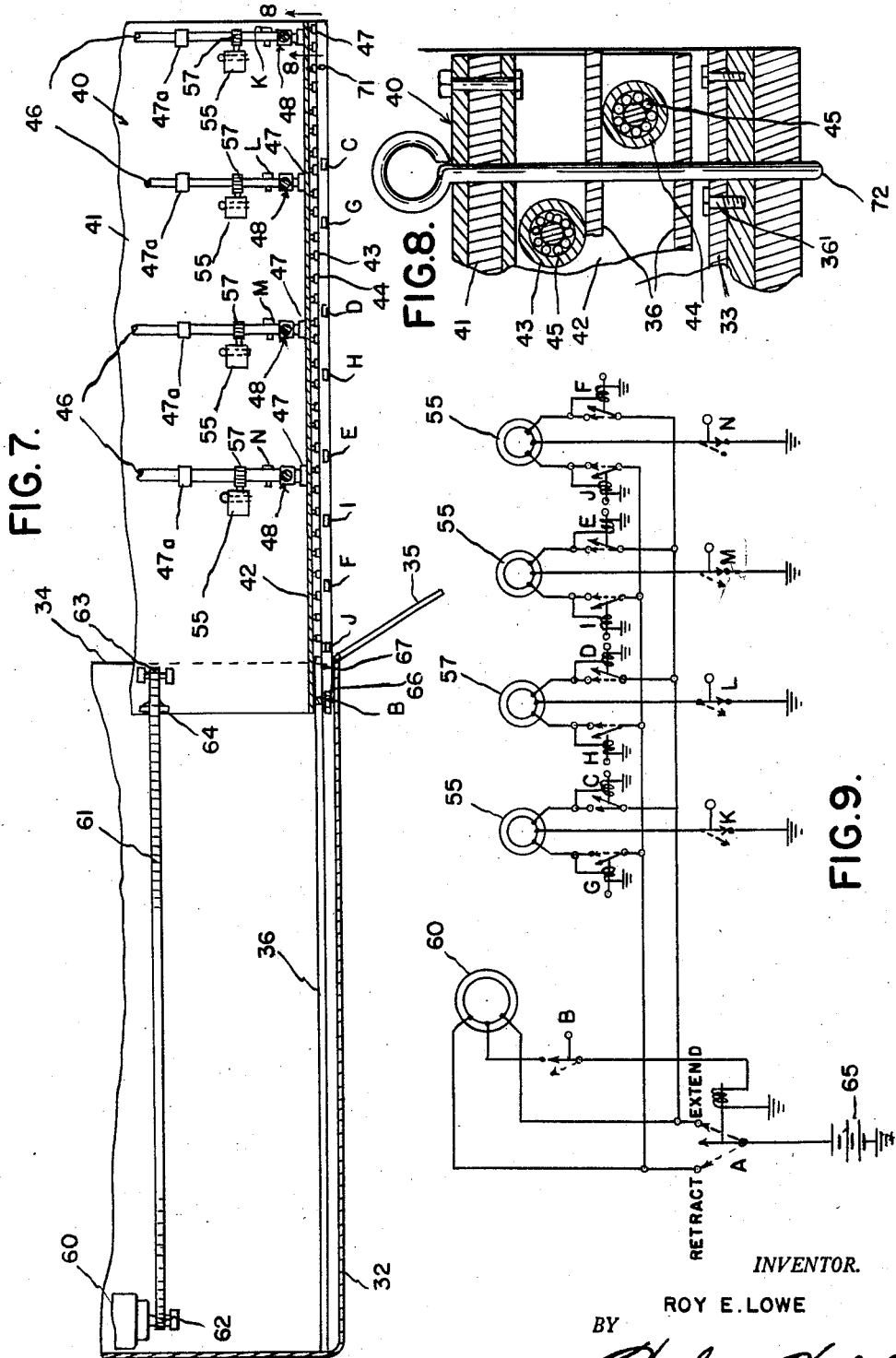
INVENTOR.
ROY E. LOWE
BY
ATTORNEYS

United States Patent Office 2,892,556
Patented June 30, 1959

2,892,556
VEHICLE LOAD HANDLING CONSTRUCTION
Roy E. Lowe, Detroit, Mich.

Application August 10, 1956, Serial No. 603,317

16 Claims. (Cl. 214—83.24)

My invention relates to vehicle construction and more particularly to a structure adapted for installation in closed load transporting vehicles to facilitate loading and unloading of same.

In the transportation field, the so-called turn-around time; that is, the time during which a vehicle is idled during loading and unloading, is a major factor of high costs and represents a problem which heretofore has not been satisfactorily solved. In the case of large semi-trailers and vans, the loaded vehicles often must remain at the loading or unloading docks overnight. In case of crowded docks, a vehicle may be idled for hours just waiting for space. If the cab is detachable from its load, it may be used to move other trailers during the time its load is being handled, but in the case of the small operator particularly this requires excessive investment in equipment and oppressive loss of time of drivers and vehicles.

Short haul operators, transporting large loads from one side of a city to the other, for example, are often caught in a ruinous squeeze where vehicles are unavailable for full capacity work because they are being loaded and unloaded such a large proportion of the time. Often this turn-around time represents over three-quarters of any twenty-four hour period.

Large vehicles must generally be loaded or unloaded one item at a time, simply because space in the vehicle only permits entrance for one piece of handling equipment. Even when additional side doors are provided, the loaders or unloaders may find themselves in each other's way, and at any rate, additional doors are unsatisfactory half-measures.

An object of my present invention is to speed loading and unloading of transportation vehicles by providing an extendable sub-floor or platform structure in the vehicle operable to move the load from the interior for easy access.

A further object of my invention is to shorten turn-around time by constructing in a vehicle a load-supporting platform operable to extend through the vehicle door opening and having jacks for supporting the extended floor on the ground, the inner end being supported by the vehicle.

Another object of my invention is to facilitate handling of vehicle loads by providing an extendable load-carrying platform having wheeled jacks for supporting the extended sub-floor on the ground, and automatic means for moving and stopping the platform and for raising and lowering the jacks, so that the jacks will be in ground engagement before the major portion of the sub-floor is extended.

For a more complete understanding of my invention, reference may be had to the accompanying drawings illustrating preferred embodiments of my invention in which like reference characters refer to like parts throughout the several views and in which Fig. 1 is a side elevational view of a preferred delivery truck, partially cut away, utilizing my invention.

Fig. 2 is a side elevational view of a preferred semi-trailer truck, partially cut away, and utilizing another embodiment of the invention.

Fig. 3 is a fragmentary cross-sectional view taken substantially on the line 3—3 of Fig. 2.

Fig. 4 is a fragmentary detail, viewed substantially from the line 4—4 of Fig. 3.

Fig. 5 is a fragmentary cross-sectional view taken substantially on the line 5—5 of Fig. 3.

Fig. 6 is an enlarged detail of a part of Fig. 5.

Fig. 7 is a lower fragmentary view as seen substantially from the line 7—7 of Fig. 3, but with the platform fully extended.

Fig. 8 is a fragmentary cross-section taken substantially on the line 8—8 of Fig. 7, and Fig. 9 is an electrical schematic illustrating a preferred operation of the invention and particularly related to Fig. 7.

Generally, one embodiment of the invention is illustrated in Fig. 1 in which a preferred type of delivery panel truck 10 is shown as having a body housing structure 11 provided with a conventional floor 11a and a rear door opening 11b closed by doors 11c. Longitudinally disposed tracks 12 are secured by any means to the floor 11a and a sub-floor or platform structure 13 provided with longitudinal tracks 14 is adapted to be movably carried and supported on the tracks 12 by means of a plurality of wheels or rollers 15. The platform structure 13 carries a load 16.

The platform structure 13 is preferably extended and retracted through the rear door opening 11b by any means such as a motor 17 mounted in the truck 10 and drivingly connected to a chain drive 18 which is secured at one point to the platform structure 13.

The jack assembly 19, preferably having a wheel 20, is pivotally mounted as at 21 to the platform structure 13 and is raised and lowered, through the arc indicated by the dotted line 22 by any suitable means such as a motor 23 and a chain drive 24. Suitable controls are of course required for extending and retracting the platform structure 13 and for raising and lowering the jack assembly 19.

It will be apparent that this construction may readily be adapted to practically any type of smaller transportation vehicle, such as grocery trucks, station wagon delivery cars, ambulances, and other types of vehicles. Loading and unloading is greatly simplified by virtue of the fact that ready access to the entire load from three sides is provided, the platform serving as its own loading dock. Also, it will be apparent that more than one such platform structure may be utilized with a single vehicle such as an ambulance having separate smaller stretcher supporting platforms.

A more detailed illustration of another embodiment of the invention may be had by referring to Figs. 2 through 9, the various details of which are of course given only as examples and which may be applied to other types of vehicle than the one herein particularly illustrated.

In this embodiment of the invention, a trailer-type vehicle 30 is illustrated as having a detachable cab structure 31 and a body housing structure 32 provided with a floor structure 33, a rear door opening 34 and door closure means 35.

It may be noted that the invention can as easily be adapted to vehicles having side doors, such as railway cars and beverage trucks in which case the platform to be described may be laterally extended and retracted.

Channel-like track members 36 are longitudinally secured to the floor structure 33 by any means such as bolts 36'. Only one track member 36 is shown in the drawings, but it is understood that at least one channel-like track will be provided on each side, their open sides being oppositely disposed so as to prevent any side play of the platform to be described.

A reinforced platform assembly 40 comprises a platform structure 41 secured to and supported on longitudinal channel-like support members 42 provided with a plurality of upper wheels or rollers 43 and lower wheels or rollers 44, which are rotatably mounted on the support members 42 by means of pins 45. The rollers 43 and 44 bearing on opposite faces of the upper horizontally disposed leg 36' of the track member 36. Thus the platform assembly 40 is longitudinally movably supported within the body housing structure 32 without being permitted to be displaced either vertically or laterally.

A plurality of longitudinally spaced pivot rods 46 are preferably laterally pivotally carried on the support member 42 by any means such as bearings 47 and on the underside of the platform structure 41 by bearings 47a. Jack assemblies 48 comprising support legs 49 secured to the pivot rods 46, spring loaded shock absorbers 50 carried by the support legs 49 and having lower supporting members 51, and axles 52 carried by the lower supporting members 51 and rotatably carrying wheels 53, are adapted to be lowered into ground engagement when the platform assembly 40 is extended out the rear door opening 34 of the body housing structure 32.

The jack assemblies may be lowered and raised by any means such as reversible electric motor 55 having worm gears 56 drivingly engaged with gears 57 secured to the pivot rods 46.

The platform assembly 40 may be extended and retracted by any means such as a reversible electric motor 60 carried in the body housing structure 32 and driving an endless chain 61 which is longitudinally disposed and preferably extended between the motor driving sprocket 62 and an idler assembly 63, the sub-floor structure 41 being connected to at least one point of the chain 61 such as at 64.

The operation of the motors 55 and 60 may be through any suitable electrical circuit such as that schematically illustrated in Fig. 9. Fig. 9 may be referred to for the preferred location of the switches and automatic actuating lugs to be hereafter described.

A main manually operated solenoid held switch A, having a "retract" and an "extend" position, and being normally spring loaded to a central off position, may be located in any suitable position in or on the cab structure 31 or the body housing structure 32, and is connected to any suitable source of electrical power such as the truck battery 65. Actuation of the switch A to the "extend" position, for example, will supply current to the motor 60, driving the chain 61 to extend the platform assembly 40. The ground circuit of the motor 60 is preferably connected to the coil of the solenoid switch A to hold it in whatever actuating position it is placed. A normally closed micro-switch B is preferably mounted on the track member 36 near the rear door opening 34, and a lug 66 preferably mounted on the underside of the platform structure 41 actuates the micro-switch B to break the ground circuit of the motor 60 before the platform assembly 40 gets to the end of the track member 36. This de-energizes the solenoid switch A, which returns to the central off position.

As the platform assembly extends, a series of solenoid held micro-switches C, D, E and F, mounted on the edge of the platform structure 41, are respectively consecutively actuated by a lug 67 which is preferably mounted on the track member 36 near the rear door opening 34 as shown in Fig. 7. The switches C, D, E, and F respectively close circuits to the motors 55, which operate to rotate the pivot rods 46 to lower the jack assemblies 48. The micro-switches, C, D, E and F are preferably positioned such that the jack assemblies 48 will begin lowering as soon as they are respectively clear of the body housing structure 32. Shunt circuits are provided to the solenoid of the micro switches C, D, E and F to hold them closed.

As each jack assembly 48 lowers into ground engagement, a lug 68 pivotally mounted on each pivot rod 46 will consecutively actuate a series of micro-switches K, L, M, and N, breaking the ground circuit of the respective motors 55, and de-energizing the solenoids of the micro-switches C, D, E, and F, which then return to the open position. A lug 68 construction which may be used is shown in Fig. 6. As the pivot rod 46 rotates in a counter-clockwise direction, as indicated by the arrow 69, the micro-switch will be actuated since the lug 68 has a tab 68a which prevents it from pivoting to the right. When the pivot rod rotates in a clockwise direction, the lug 68, having a light spring 68b, will tip to the left, so as not to actuate the micro-switch. It is understood that wherever required, an actuating lug such as this may be utilized so as to actuate its respective micro-switch when it travels only in the desired direction.

To retract the platform assembly 40, the main switch A will be operated to "retract" position, reversing the motor 60. As each respective micro-switch J, I, H and G, mounted on the edge of the sub-floor structure 41, hits the lug 67, the respective motors 55 are consecutively operated in reverse, raising the respective jack assemblies 48 in reverse consecutive order. As each jack assembly 48 reaches its raised position, a second lug 70 mounted on each pivot 46 opens the motor ground circuits and the respective solenoid shunt circuits of the micro-switches J, I, H and G. When the platform assembly 40 is fully retracted, a lug 71 carried near the outer end of the sub-floor structure 41 hits the micro-switch B, stopping the motor 60 as previously explained.

When the vehicle 30 is in transit, suitable means may preferably be provided for locking the platform assembly 40 against longitudinal displacement. Fig. 8 illustrates one such means, a pin 72, which may be dropped through aligned holes in the platform assembly 40, the track member 36, and the floor structure 33. Also, it will be seen in Fig. 3 that the wheels 53 are laterally shiftable on the axles 52, permitting the wheels 53 to slip past stones or other objects on the ground that may be engaged during movement of the platform assembly 40.

It will be apparent to one skilled in the art to which my invention pertains that various changes and modifications may be made therein without departing from the spirit of the invention or the scope of the appended claims.

I claim:

1. In a load transporting vehicle comprising a body housing structure, an open-sided platform carrying said load, means removably supporting said platform within said housing structure, actuating means operable to selectively extend the major part of said load-carrying platform from said housing structure to give access to said load from the open sides, said platform carrying supporting elements for supporting the extended part of said platform on the ground, the inner part of said platform being supported in and by said body structure at all times, said supporting elements comprising adjustable jacks actuated to project downwardly and to support the extended platform on the ground, and controllable means actuated on extending said platform to lower said jacks into ground engagement, said jacks provided with wheels for movably supporting said platform on the ground after said jacks have been lowered and while said platform is being extended.

2. In a load transporting vehicle comprising a body housing structure, an open-sided platform carrying said load, means removably supporting said platform within said housing structure, actuating means operable to selectively extend the major part of said load-carrying platform from said housing structure to give access to said load from the open sides, said platform carrying supporting elements for supporting the extended part of said platform on the ground, the inner part of said platform being supported in and by said body structure, said supporting elements comprising adjustable jacks actuated to project downwardly and to support the extended platform on the ground, and controllable means actuated on extending said platform to lower said jacks into ground engagement, and means actuated by said platform for automatically stopping extension of said platform at its extreme extended position.

3. In a load transporting vehicle comprising a body housing structure, an open-sided platform carrying said load, means removably supporting said platform within said housing structure, actuating means operable to selectively extend the major part of said load-carrying platform from said housing structure to give access to said load from the open sides, said platform carrying supporting elements for supporting the extended part of said platform on the ground, the inner part of said platform being supported by said body structure, said supporting elements comprising a plurality of sets of longitudinally spaced adjustable jacks, and controllable means operable for successively lowering said sets of jacks during extension of said platform, said controllable means including an electrical circuit having micro-switches and the like successively actuated by movement of said platform relative to said housing structure to successively lower said sets of jacks.

4. In a load transporting vehicle comprisnig a body housing structure, an open-sided platform carrying said load, means removably supporting said platform within said housing structure, actuating means operable to selectively extend the major part of said load-carrying platform from said housing structure to give access to said load from the open sides, said platform carrying supporting elements for supporting the extended part of said platform on the ground, the inner part of said platform being supported by said body structure, said supporting elements comprising a plurality of sets of longitudinally spaced adjustable jacks, and controllable means operable for successively lowering said sets of jacks during extension of said platform, said controllable means including an electrical circuit having micro-switches and the like successively actuated by movement of said platform relative to said housing structure to successively lower said sets of jacks, and means actuated by movement of said jacks to stop movement of same at the extreme downward position.

5. In a load transporting vehicle comprising a body housing structure, a platform carrying said load, means removably supporting said platform within said housing structure, actuating means operable to selectively extend the major part of said platform from said housing structure, said platform carrying supporting elements for supporting the extended part of said platform on the ground, the inner part of said platform being supported by said body structure, said supporting elements comprising adjustable jacks actuated to project downwardly and to support the extended platform on the ground and controllable means actuated on extending said platform to lower said jacks into ground engagement, said housing structure having supporting tracks, said platform supported on said tracks, and said controllable means operable to lower said jacks into ground engagement when the major portion of the platform is carried by said body structure, whereby to provide a firm support for said extended platform at all times.

6. In a load transporting vehicle comprising a body housing structure, a platform carrying said load, means removably supporting said platform within said housing structure, actuating means operable to selectively extend the major part of said platform from said housing structure, said platform carrying supporting elements for supporting the extended part of said platform on the ground, the inner part of said platform being supported by said body structure, said supporting elements comprising adjustable jacks actuated to project downwardly and to support the extended platform on the ground and controllable means actuated on extending said platform to lower said jacks into ground engagement, said housing structure having supporting tracks, said platform supported on said tracks, and said controllable means operable to lower said jacks into ground engagement when the major portion of the platform is carried by said body structure, whereby to provide a firm support for said extended platform at all times, said supporting tracks comprising a plurality of channel structures mounted in said housing structure, said platform provided with a plurality of channel members respectively interlocked with said channel structures to prevent lateral displacement of said platform with respect to said housing structure, said platform channel members each carrying a plurality of roller elements arranged to roll on said supporting track channel structures.

7. In a load transporting vehicle comprising an elongated body housing structure provided with a rear end opening and door closure means therefor, an open-sided platform carrying said load, means removably supporting said platform within said housing structure, actuating means operable to selectively extend the major position of said load-carrying platform longitudinally out said rear end opening to give access to said load from the open sides, said platform carrying supporting elements for supporting the extended portion of said platform on the ground, the inner end of said platform being supported by said body structure, said supporting elements comprising adjustable jacks actuated to project downwardly and to support the extended platform on the ground, and controllable means actuated on extending said platform to lower said jacks into ground engagement.

8. In a load transporting vehicle comprising an elongated body housing structure provided with a rear end opening and door closure means therefor, an open-sided platform carrying said load, means removably supporting said platform within said housing structure, actuating means operable to selectively extend the major portion of said load-carrying platform longitudinally out said rear end opening to give access to said load from the open sides, said platform carrying supporting elements for supporting the extended portion of said platform on the ground, the inner end of said platform being supported by said body structure, said supporting elements comprising adjustable jacks actuated to project downwardly and to support the extended platform on the ground, and controllable means actuated on extending said platform to lower said jacks into ground engagement, said platform constructed to be retracted entirely within said housing structure permitting said door closure means to close said rear end opening.

9. In a load transporting vehicle comprising an elongated body housing structure provided with a rear end opening and door closure means therefor, a platform carrying said load, means removably supporting said platform within said housing structure, actuating means operable to selectively extend the major portion of said platform longitudinally out said rear end opening, said platform carrying supporting elements for supporting the extended portion of said platform on the ground, the inner end of said platform being supported by said body structure, said supporting elements comprising adjustable jacks actuated to project downwardly and to support the extended platform on the ground, and controllable means actuated on extending said platform to lower said jacks into ground engagement, said platform constructed to be restricted entirely within said housing structure permitting said door closure means to close said rear end opening, and means locking said retracted platform to said housing structure against longitudinal movement with respect to same.

10. In a load transporting vehicle comprising a body housing structure provided with enclosing side walls, an open-sided platform carrying said load, means removably supporting said platform within said housing structure and enclosed by said side walls, actuating means operable to selectively extend the major part of said load-carrying platform from within said housing structure side walls to give direct lateral access to said load from without said vehicle, said platform carrying supporting elements for supporting the extended part of said platform on the ground, the inner part of said platform being supported in and by said body structure at all times, said supporting elements comprising adjustable jacks actuated to project downwardly and to support the extended platform on the ground, and controllable means actuated on extending said platform to lower said jacks into ground engagement.

11. In a load transporting vehicle comprising a body housing structure provided with enclosing side walls, an open-sided platform carrying said load, means removably supporting said platform carrying said load, means removably supporting said platform within said housing structure and enclosed by said side walls, actuating means operating to selectively extend the major part of said load-carrying platform from within said housing structure side walls to give direct lateral access to said load from without said vehicle, said platform carrying supporting elements for supporting the extended part of said platform on the ground the inner part of said platform being supported in and by said body structure when said platform is extended, said supporting elements comprising adjustable jacks actuated to project downwardly and to support the extended platform on the ground, and controllable means operable for lowering said jacks into ground engagement when the platform is extended an amount sufficient to provide clearance for movement of said jacks with respect to the housing structure.

12. In a load transporting vehicle comprising a body housing structure provided with enclosing side walls, an open-sided platform carrying said load, means removably supporting said platform within said housing structure and enclosed by said side walls, actuating means operable to selectively extend the major part of said load-carrying platform from within said housing structure side walls to give direct lateral access to said load from without said vehicle, said platform carrying supporting elements for supporting the extended part of said platform on the ground, the inner part of said platform being supported in and by said body structure when said platform is extended, said supporting elements comprising a plurality of sets of longitudinally spaced adjustable jacks, and controllable means operable for successively lowering said sets of jacks during extension of said platform.

13. In a load transporting vehicle comprising a body housing structure provided with enclosing side walls, an open-sided platform carrying said load, means removably supporting said platform within said housing structure and enclosed by said side walls, actuating means operable to selectively extend the major part of said load-carrying platform from within said housing structure side walls to give direct lateral access to said load from without said vehicle, said platform carrying supporting elements for supporting the extended part of said platform on the ground, the inner part of said platform being supported in and by said body structure when said platform is extended, said supporting elements comprising a plurality of sets of longitudinally spaced adjustable jacks, and controllable means operable for successively lowering said sets of jacks during extension of said platform, one set of jacks disposed at the extreme extended end of said platform, and the other sets of jacks disposed at intermediate positions of said platform.

14. In a load transporting vehicle comprising a body housing structure provided with enclosing side walls, an open-sided platform carrying said load, means removably supporting said platform within said housing structure and enclosed by said side walls, actuating means operable to selectively extend the major part of said load-carrying platform from within said housing structure side walls to give direct lateral access to said load from without said vehicle, said platform carrying supporting elements for supporting the extended part of said platform on the ground, the inner part of said platform being supported in and by said body structure at all times, said supporting elements comprising adjustable jacks actuated to project downwardly and to support the extended platform on the ground, means operable to lower said jacks into ground engagement only when said platform is extended a predetermined distance and while the major portion of said platform is yet supported by and carried by said housing structure.

15. In a load transporting vehicle comprising a body housing structure provided with enclosing side walls, an open-sided platform carrying said load, means removably supporting said platform within said housing structure and enclosed by said side walls, actuating means operable to selectively extend the major part of said load-carrying platform from within said housing structure side walls to give direct lateral access to said load from without said vehicle, said platform carrying supporting elements for supporting the extended part of said platform on the ground, the inner part of said platform being supported in and by said body structure at all times, said supporting elements comprising adjustable jacks actuated to project downwardly and to support the extended platform on the ground, means operable to lower said jacks into ground engagement only when said platform is extended a predetermined distance and only while the major portion of said platform is yet supported by and carried by said housing structure, and means operable to raise said jacks only when said platform is retracted from the fully extended position a predetermined distance and when the major portion of said platform is supported by and carried by said housing structure.

16. In a load transporting vehicle comprising a body housing structure provided with enclosing side walls, an open-sided platform carrying said load, means removably supporting said platform within said housing structure and enclosed by said side walls, actuating means operable to selectively extend the major part of said load-carrying platform from within said housing structure side walls to give direct lateral access to said load from without said vehicle, said platform carrying supporting elements for supporting the extended part of said platform on the ground, the inner part of said platform being supported in and by said body structure at all times, said supporting elements comprising adjustable jacks actuated to project downwardly and to support the extended platform on the ground, means operable to lower said jacks into ground engagement only when said platform is extended a predetermined distance and only while the major portion of said platform is yet supported by and carried by said housing structure, and means operable to raise said jacks only when said platform is retracted from the fully extended position a predetermined distance and when the major portion of said platform is supported by and carried by said housing structure, said jacks being actuated to fold upward toward said housing structure in a vertical plane parallel with the direction of movement of said platform and to be nested beneath said platform between said platform and said housing structure when said platform is retracted within said housing structure.

(References on following page)

References Cited in the file of this patent

UNITED STATES PATENTS

| | | |
|---|---|---|
| 703,990 | Burton | July 8, 1902 |
| 1,443,594 | Saives | Jan. 30, 1923 |
| 2,085,043 | Richter | June 29, 1937 |
| 2,186,463 | Maine | Jan. 9, 1940 |
| 2,514,752 | Faulkner et al. | July 11, 1950 |
| 2,523,962 | Mahaffey et al. | Sept. 26, 1950 |
| 2,621,811 | Lull | Dec. 16, 1952 |
| 2,643,395 | Stassinos | June 30, 1953 |
| 2,788,137 | Harkness | Apr. 9, 1957 |

FOREIGN PATENTS

| | | |
|---|---|---|
| 679,285 | Great Britain | Sept. 17, 1952 |